(12) United States Patent
Jackson et al.

(10) Patent No.: US 9,336,159 B2
(45) Date of Patent: May 10, 2016

(54) MANAGING A CACHE FOR STORING ONE OR MORE INTERMEDIATE PRODUCTS OF A COMPUTER PROGRAM

(71) Applicant: International Business Machines Corporation, Armonk, NY (US)

(72) Inventors: Callum P. Jackson, Whiteley (GB); Bin Jia, Chandlers Ford (GB); Matthew W. Leming, Romsey (GB); Philip Norton, Bishopstoke (GB)

(73) Assignee: INTERNATIONL BUSINESS MACHINES CORPORATION, Armonk, NY (US)

( * ) Notice: Subject to any disclaimer, the term of this patent is extended or adjusted under 35 U.S.C. 154(b) by 133 days.

(21) Appl. No.: 14/052,180

(22) Filed: Oct. 11, 2013

(65) Prior Publication Data

US 2014/0108735 A1    Apr. 17, 2014

(30) Foreign Application Priority Data

Oct. 12, 2012    (GB) .................................. 1218312.5

(51) Int. Cl.
*G06F 12/12*    (2006.01)
*G06F 9/50*    (2006.01)

(52) U.S. Cl.
CPC ............ *G06F 12/128* (2013.01); *G06F 9/5016* (2013.01)

(58) Field of Classification Search
CPC .................................................. G06F 12/128
See application file for complete search history.

(56) References Cited

U.S. PATENT DOCUMENTS

| 5,987,568 | A | * | 11/1999 | Adams et al. ................. 711/118 |
| 7,146,355 | B2 | | 12/2006 | Chu-Carroll |
| 7,720,931 | B2 | | 5/2010 | Mei et al. |
| 8,117,589 | B2 | | 2/2012 | Christensen et al. |
| 2002/0062354 | A1 | * | 5/2002 | Suraski et al. ................. 709/212 |
| 2004/0172385 | A1 | * | 9/2004 | Dayal .............................. 707/3 |
| 2005/0183067 | A1 | | 8/2005 | Dimpsey et al. |
| 2006/0200645 | A1 | | 9/2006 | Kumar |
| 2007/0143752 | A1 | | 6/2007 | Clemm et al. |
| 2008/0209102 | A1 | | 8/2008 | Nakano |
| 2009/0083268 | A1 | | 3/2009 | Coqueret et al. |
| 2010/0169302 | A1 | * | 7/2010 | Lopes et al. ................... 707/713 |
| 2010/0306730 | A9 | | 12/2010 | Carlson et al. |
| 2011/0010687 | A1 | | 1/2011 | Plante |
| 2011/0213924 | A1 | * | 9/2011 | Ledford .............. G06F 12/0868 711/113 |

OTHER PUBLICATIONS

Fasano, Fausto, "Fine-Grained Management of Software Artefacts", Fondo Sociale Europeo, Dottorato di Ricerca in Informatica, Apr. 2007, 180 pages.
GB Search Report for GB1218312.5, mailed Feb. 25, 2013, 4 pages.

* cited by examiner

*Primary Examiner* — Henry Tsai
*Assistant Examiner* — John Roche
(74) *Attorney, Agent, or Firm* — Cantor Colburn LLP

(57) ABSTRACT

A method, program product and a system is provided for managing a cache. The method includes analyzing at least an intermediate product of a computer program. The intermediate product is produced by the computer program in response to a set of control inputs. The method also includes determining a resource measure associated with the first intermediate product and determining a resource measure value for the first intermediate product using a first set of control inputs> The first intermediate product is stored in the cache upon determination that the resource measure value exceeds a predetermined resource threshold.

19 Claims, 6 Drawing Sheets

MANAGING A CACHE FOR STORING ONE OR MORE INTERMEDIATE PRODUCTS OF A COMPUTER PROGRAM

PRIORITY

This application claims priority to Great Britain Patent Application No. 1218312.5, filed 12 Oct. 2012, and all the benefits accruing therefrom under 35 U.S.C. §119, the contents of which in its entirety are herein incorporated by reference.

BACKGROUND

The present invention relates to managing a cache and more specifically to managing a cache that stores one or more intermediate products of a computer program.

In computer systems, most application programs may be provided for producing products, which require significant amounts of computing resource to create. Furthermore, the products may be relatively large and require correspondingly large amounts of storage. Examples of such products comprise software, documents, images, video or audio. The products may be cached to enable re-use where appropriate. However, where relatively large numbers of products are provided by a given application program the management of the cache may become complex or the storage space required for such caching may be prohibitively large.

BRIEF SUMMARY

A method, system and program product is provided for managing a cache. In one embodiment, the method includes analyzing a first intermediate product of a computer program. The intermediate product is produced by the computer program in response to a set of control inputs received by the computer program. The method also includes identifying a resource measure associated with the production of the first intermediate product and determining a resource measure value by using the control inputs associated with the first intermediate product, The first intermediate product is then stored in the cache upon determination that the resource measure value exceeds a predetermined resource threshold.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
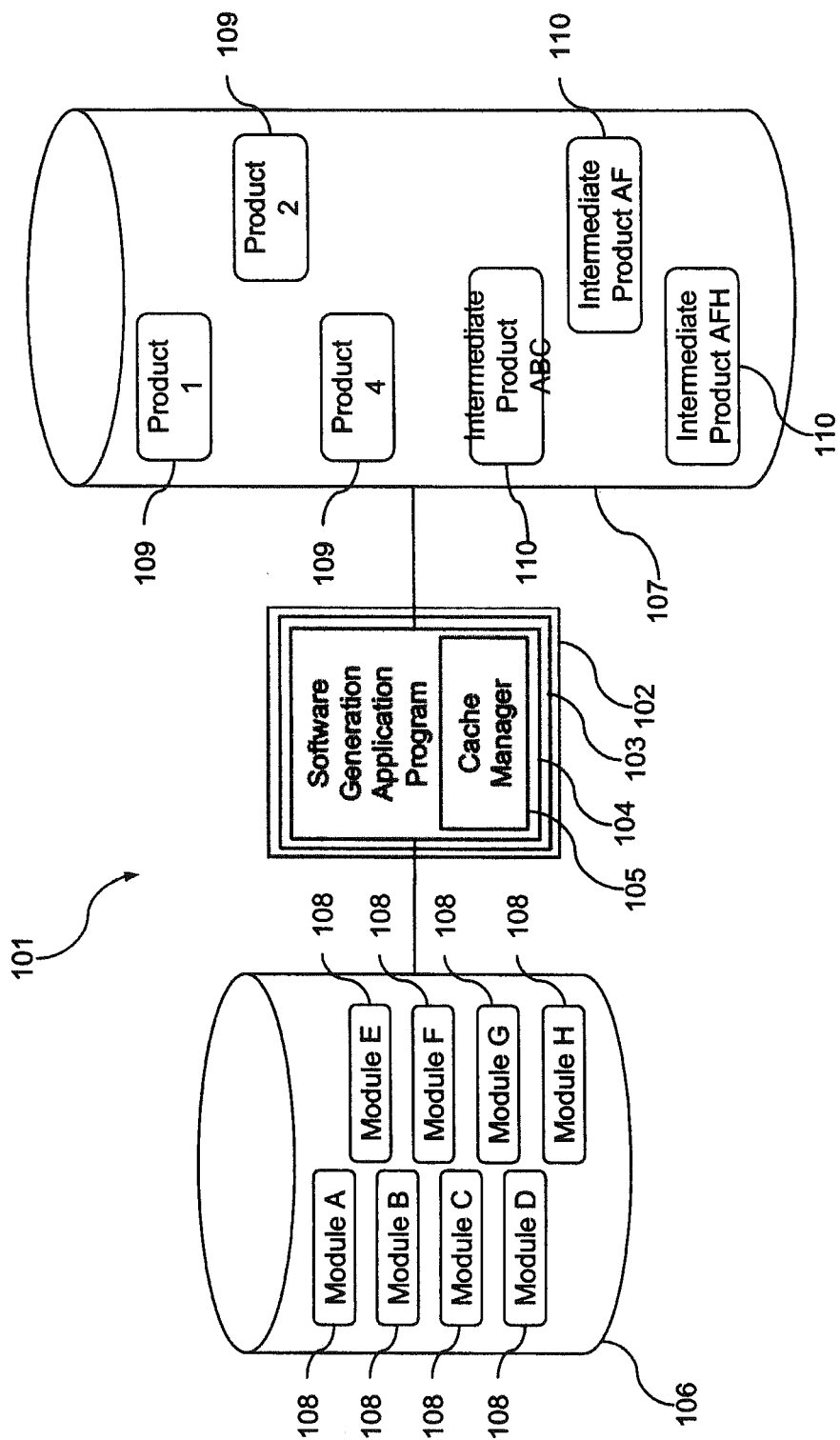
FIG. 1 depicts a schematic diagram illustrating a software generated application program, in accordance with an embodiment.

FIG. 1 illustrates a computer system 101 which comprises a computer 102 provided with an operating system 103 and running an application program 104 in the form of a software generation application program. In one embodiment, the application program 104 comprises a cache manager module 105. The computer 102 is connected to first and second storage devices 106, 107. The first storage device 106 is arranged for storing a set of software modules 108 and the second storage device 107 is arranged for storing one or more of the software products 109 produced by the application program 104. The application program 104 is arranged, in response to a set of one or more control inputs, in the form of one or more user inputs, to input and process a selected set of the modules 108 to produce one of the software products 109. During the production of one or more of the software products 109, the application program 104 may produce one or more intermediate products 110. The intermediate products 110 may be stored on the second storage device 107 under the control of the cache manager 105 in accordance with a predetermined set of criteria as described further below. The cached intermediate products 110 are provided for subsequent processing by the application program 104.

Figure 2:
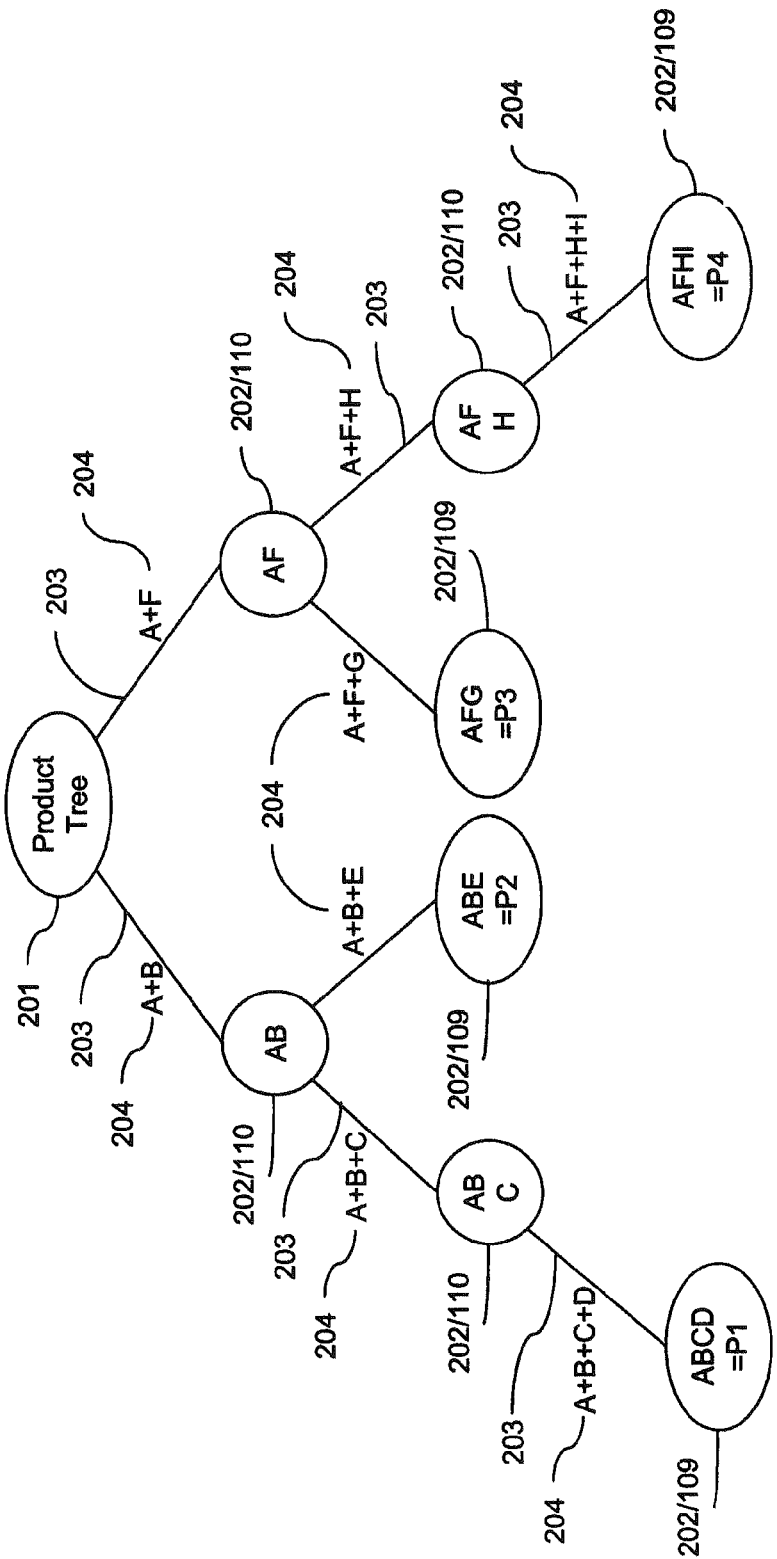
FIG. 2 is a schematic diagram illustrating a set of modules having both intermediate products and final products generated by the software application program of FIG. 1.

The application program 104 is arranged to produce each of the set of software products 109 from a selected set of the modules 108. A proportion of the software products 109 are produced from one or more of the intermediate products 110. FIG. 2 shows a product tree 201 for the present embodiment representing the set of all possible final software products 109 that may be produced by the application program 104 and their respective sets of one or more precursors in the form of the intermediate products 110. Each node 202 of the tree 201 represents either a final software product 109 or an intermediate product 110. Each arc 203 of the tree 201 is annotated with the sequence of control inputs 204 required to produce the lowermost intermediate product 110 or final software product 109 from the relevant precursors in the tree 201. For any given node 202, each subsequent arc 203 represents a point of variance in the tree 201 as a consequence of the associated control input and resulting in the succeeding node 202.

In one embodiment, the cache manager 105 is arranged to consider each intermediate product 110 and final product 109 produced by the application program 104 for caching on the second storage device 107. Each step of production, that is, the processing of a further one of the modules 108 with another module 108 or intermediate product 110, is associated with a predetermined resource measure value (RMV). In the present embodiment, the resource measure is the number of central processing unit (CPU) cycles used by the computer 102 for processing the associated production step. In this embodiment, the application program 104 is arranged to record the RMV for each output intermediate or final product 110, 109. The cache manager 105 is provided with a predetermined threshold value for the resource measure. The cache manager 105 is arranged to cache only intermediate products 110 or final products having a resource measure value exceeding the predetermined threshold. If a first intermediate product 110 has a resource measure value that does not exceed the predetermined threshold, the resource measure value of the first intermediate product 110 may be accumulated or inherited by one or more subsequent intermediate products 110 produced from the first intermediate product 110. Thus, any given RMV for a given intermediate product 110 may be cumulative. In this embodiment, such accumulation or inheritance of RMVs by subsequent intermediate or final products is managed by the cache manager 105 as described further below.

In response to a request to the application program 104 for the relevant final product 109, if the requested final product 109 has been cached, the cached version is provided to a requestor in lieu of a newly produced version. The cached intermediate products 110 are provided to the application program 104 in response to a request for a given product 109 so as to provide a processing precursor. In the present embodiment, the application program is arranged to output each relevant intermediate product 110 created in the production of a requested subsequent intermediate product 110 or final product 109. Each such intermediate product 110 is considered by the cache manager 105 as a cache candidate.

Figure 3:
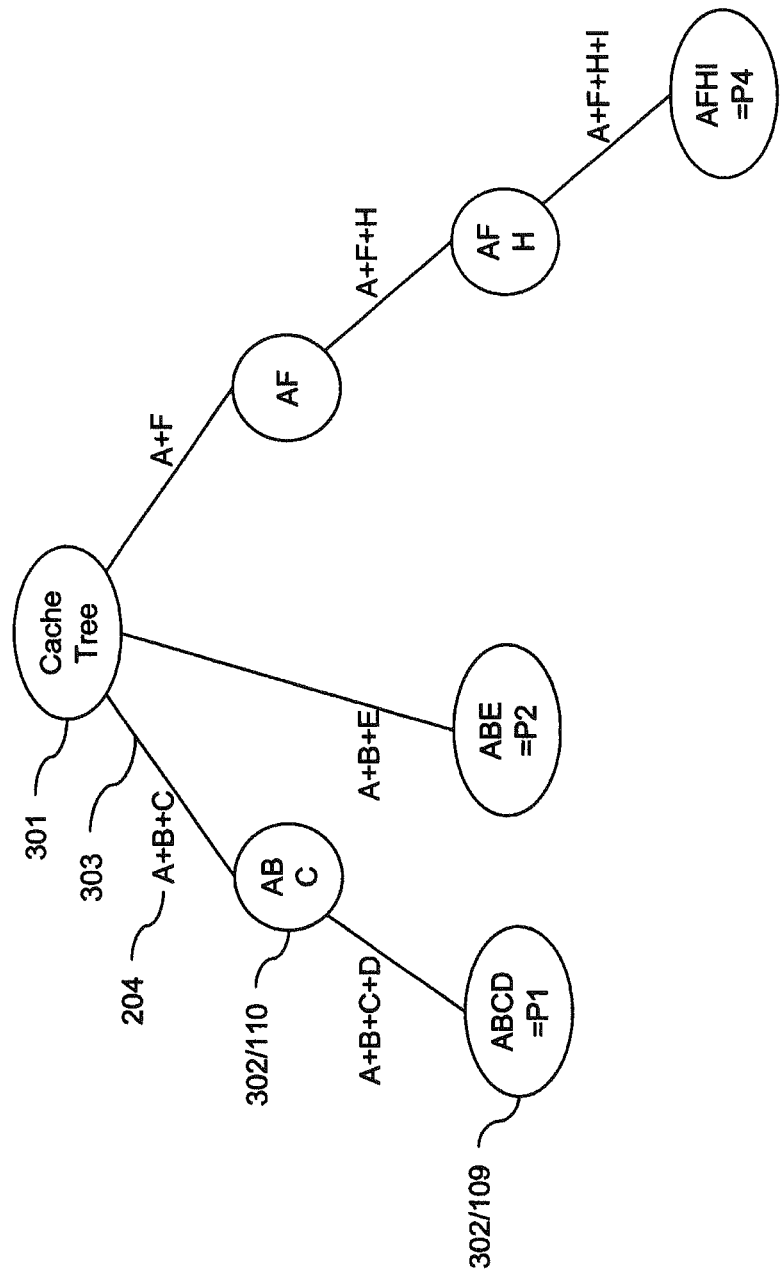
FIG. 3 is a schematic diagram illustrating an example of the output of the software generation application program of FIG. 1.

In FIG. 3, the cache manager is arranged to manage the contents of the cache 107 using a tree data structure 301 in the form of a cache tree. The cache tree 301 is structured in the same manner as the product tree 201 described above with reference to FIG. 2. The cache tree thus comprises nodes 302 representing final products 109 or intermediate products 110 and arcs 303 representing a relevant sequence of control inputs 204. While full labelling of the product tree 201 of FIG. 2 is provided, minimal labelling is used in the cache tree 301 of FIG. 3 for clarity. At any given point in time the cache tree 301 identifies all the final products 109 and associated production precursors in the form of the intermediate products 110 that have been produced by the application program 104 and that have an associated resource measure value exceeding the predetermined threshold. Therefore, not all intermediate products 110 produced by the application program 104 appear singly in the cache tree 301. Instead, any intermediate product having an associated resource measure value that meets or falls below the threshold will only appear in the cache tree 301 as part of a subsequent intermediate product 110 or the resulting final product 109.

Comparing the cache tree 301 to the product tree 201 of FIG. 2 it can be seen that two nodes 202 from the product tree 201, representing the intermediate product 110 AB and the final product 109 P3 created from the modules 108 A, F, G, are not represented in the cache tree 301. Since the cache tree 301 represents the contents of the cache 107, that is, the cached products 109 or intermediate products 110, the intermediate product 110 AB and the final product 109 P3 are not stored in the cache 107. The absence of the intermediate product 110 AB in the cache tree 301 and consequently from the cache 107 results from the resource measure value for the intermediate product 110 AB meeting or falling below the predetermined threshold. However, the cumulative resource measure value for the subsequent intermediate product 110 ABC exceeded the threshold and is thus represented in the cache 107 and the cache tree 301. The absence of the final product 109 P3 from the cache tree results from two possibilities: the production of the final product 109 P3 from the intermediate product 110 AF and the module 108 G generated a resource measure value meeting or falling below the predetermined threshold; or the application program 104 has not yet produced the final product 109 P3.

Figure 4:
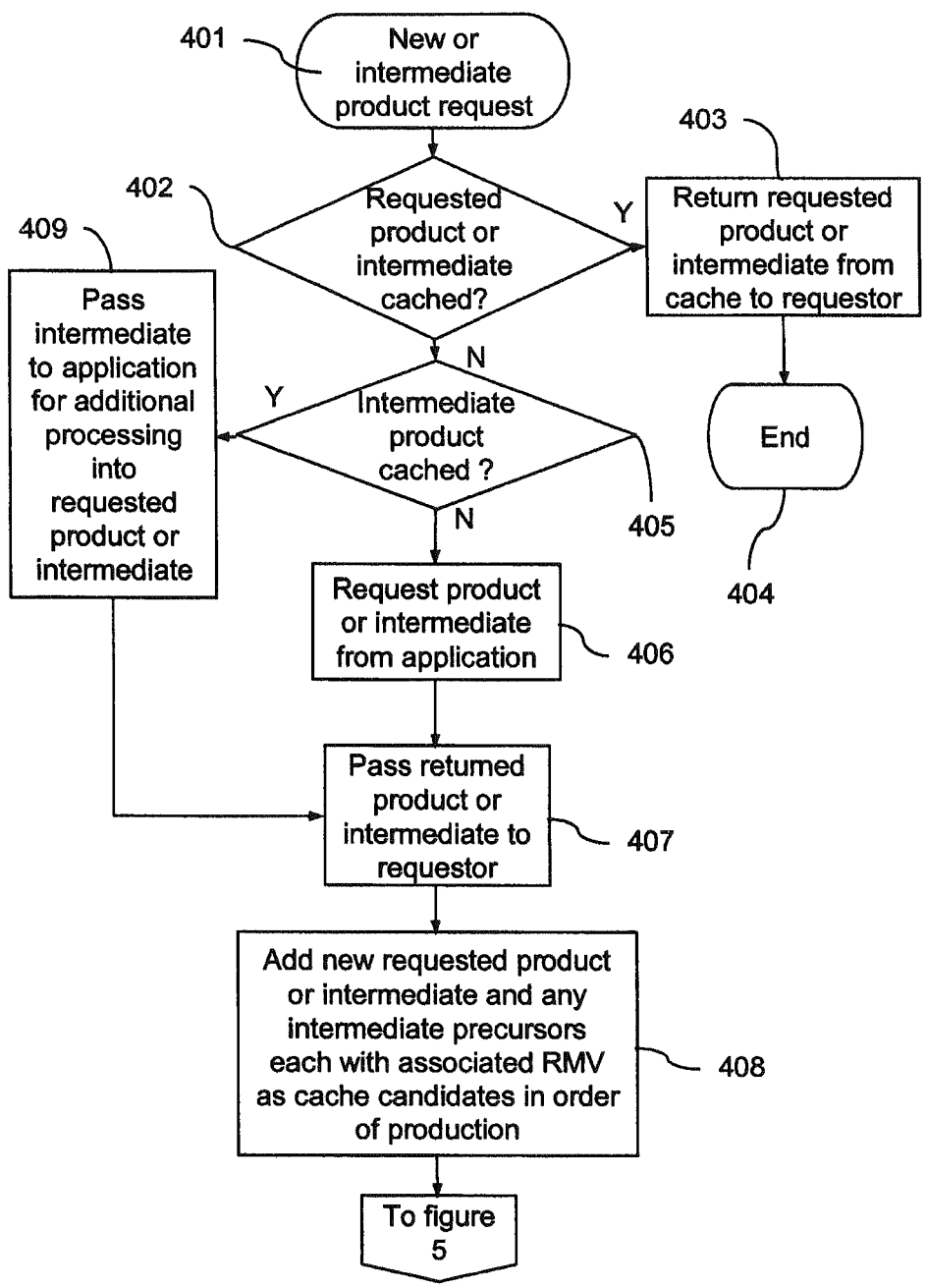
FIG. 4 is a flow diagram illustrating a cache response generated in connection of an application program, in accordance with an embodiment.

The processing performed by the cache manager 105 for managing the caching of the products of the application program 104 will now be described in further detail with reference to the flowchart of FIG. 4. Processing of the cache manager 105 is initiated at step 401 in response to a request to the application program 104, in the form of a set of one or more control inputs, to produce an intermediate or final product 110, 109 and processing moves to step 402. At step 402 the cache tree 301 is searched to identify a node representing the requested intermediate or final product 110, 109 and if present processing moves to step 403. At step 403 the intermediate or final product 110, 109 identified in the cache tree is retrieved from the cache 107 and returned to the requestor in response to the input set of control inputs. Processing then moves to step 404 and ends. If at step 402 the intermediate or final product 110, 109 is not identified in the cache tree 301 then processing moves to step 405. At step 405 the cache tree 301 is further searched to identify any node representing a precursor to the requested intermediate or final product 110, 109, that is an intermediate product that is a predecessor in the production process for the requested intermediate or final product 110, 109, and if none is identified then processing moves to step 406. At step 406 the request, in the form of the set of control inputs, is input to the application program 104 and processing moves to step 407.

At step 407 the requested intermediate or final product 110, 109 output by the application program 104 is passed to the requestor and processing moves to step 408. Each such output intermediate or final product 110, 109 produced from an identified precursor is associated with an RMV based on the number of CPU cycles required to produce that intermediate or final product 110, 109 from the identified precursor but does not take into account any RMV previously associated with the precursor itself. At step 408 the newly produced requested intermediate or final product 110, 109 and any relevant precursors are placed in a set of cache candidates in association with the respective resource measure values (RMVs). The set of cache candidates is ordered by relative production time. If at step 405 a precursor to the requested intermediate or final product 110, 109 is identified in the cache tree 301 then processing moves to step 409. At step 409 the corresponding intermediate product 110 is extracted from the cache 107 for input to the application program 104 in combination with the control input so as to enable the application to use the intermediate product 110 as a precursor for the production of the requested intermediate or final product 110, 109. Processing then moves to step 407 and proceeds as described above. Processing then moves to step 501 of FIG. 5.

In one embodiment, when the application program 104 receives a cached precursor, for example at step 409, it also is provided with a full set of control inputs for producing the requested intermediate or final product 110, 109. In the present embodiment, the application program 104 is arranged to identify the subset of those control inputs relevant to producing the requested intermediate or final product 110, 109 from the precursor supplied from the cache 107. In the present embodiment, the application program 104 identifies this subset of control inputs by from the difference between the control inputs 204 from the cache tree associated with the cached precursor and the control inputs provided as part of the request for the requested intermediate or final product 110, 109. Furthermore, as noted above, when producing a product based on such a precursor, the RMV for the precursor-based result is incremental, that is, comprises only the additional resource measure value for producing the requested intermediate or final product 110, 109 from the precursor. In other words, the RMV does not include at this point in the processing any element of the RMV for producing the precursor itself. This mechanism ensures that the precursor-based product does not have a falsely inflated RMV and is treated in a comparable manner to other cache candidates.

Figure 5:
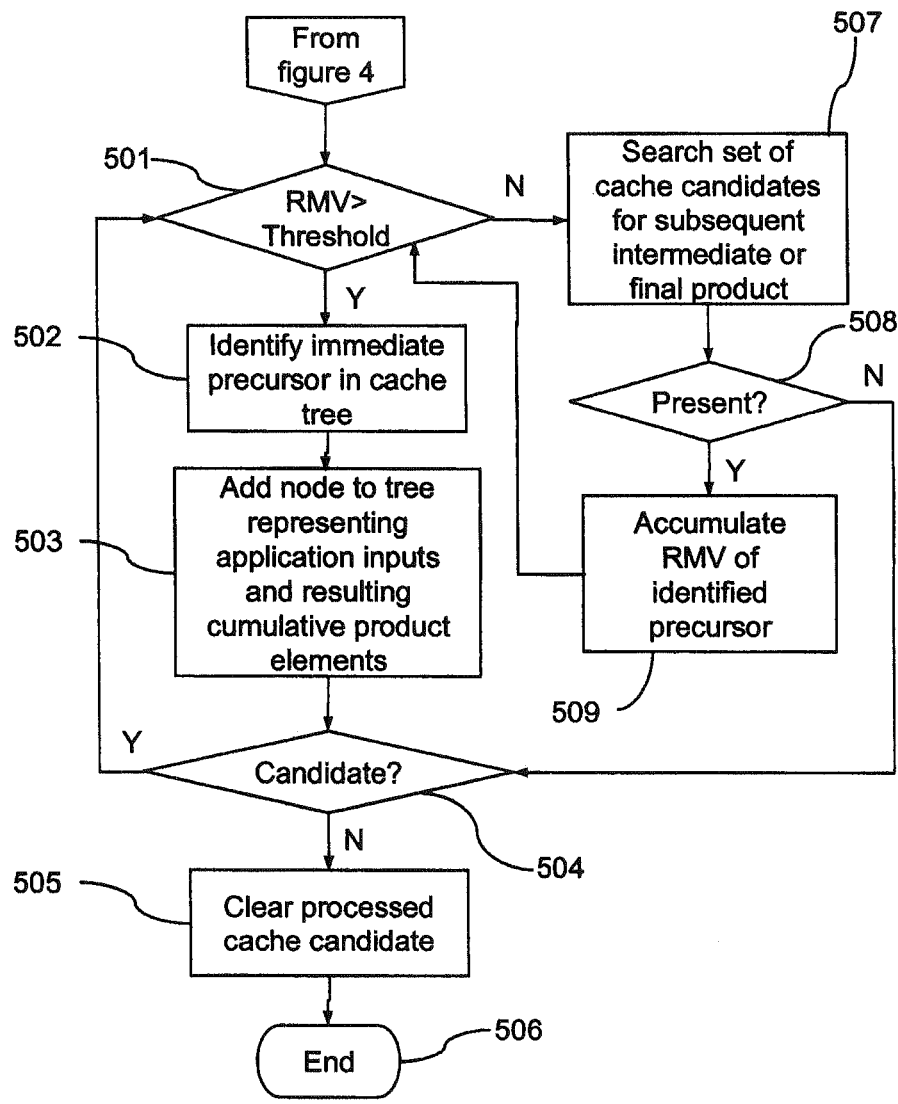
FIG. 5 is a flow diagram illustrating processing performed by a cache manager, in accordance with an embodiment.

In FIG. 5, at step 501, in response to the production of a new set of one or more cache candidates, the resource measure value (RMV) for the first new cache candidate in sequence of production is compared to the predetermined threshold and if the RMV exceeds the threshold processing moves to step 502. At step 502 the cache tree 301 is searched to identify the nearest precursor to the new cache candidate and processing moves to step 503. At step 503 the cache candidate is stored in the cache 107 and a corresponding node 302 added to the cache tree 301 connected by an arc 303 to the identified nearest precursor. The new arc 303 is associated with data identifying the set of control inputs for producing the new cache candidate and processing moves to step 504. At step 504, if a further new cache candidate is present in the set then processing returns to step 501 and proceeds as described above. If at step 504 no new cache candidate is present then processing moves to step 505. At step 505 the processed set of cache candidates is cleared and processing moves to step 506 and ends. If at step 501 the RMV for a given cache candidate meets or falls below the predetermined threshold then processing moves to step 507. At step 507 the set of cache candidates is searched for any previously considered intermediate product comprising an immediate precursor to the current cache candidate and processing moves to step 508. At step 508 if no such precursor is identified then the current cache candidate is marked as processed but left in the set of cache candidates as a possible precursor for subsequently processed cache candidates. Processing then moves to step 504 and proceeds as described above. If at step 508 a precursor cache candidate is identified then processing moves to step 509 where the RMV of the precursor cache candidate is accumulated in the RMV of the current cache candidate and processing moves to step 501 where the new RMV of the current cache candidate, that is, the current RMV with the inherited RMV from the identified precursor cache candidate, and processing proceeds as described above until all unprocessed new cache candidates have been processed as described above.

In one embodiment, at any given time the set of cache candidates may comprise cache candidates that have been processed as described above, marked as processed, but remain in the set of cache candidates because their respective RMV meets or falls below the RMV threshold. Such processed but remaining cache candidates provide a mechanism for the inheritance of their respective RMVs by subsequent cache candidates which may then have sufficiently high RMVs to be cached or may themselves be marked as processed but maintained in the set of cache candidates.

In another embodiment, the cache manager 105 is further arranged to manage the overall size of the cache 107 within a predetermined storage threshold. The size of the cache is determined each time a cache candidate is added to the cache 107 in step 503 and if the storage threshold is exceeded the cache 107 is pruned in accordance with a predetermined rule. In the present embodiment, the predetermined rule determines that the largest member of the cache is deleted first and the process repeated until the cache 107 meets or falls below the storage threshold.

Figure 6:
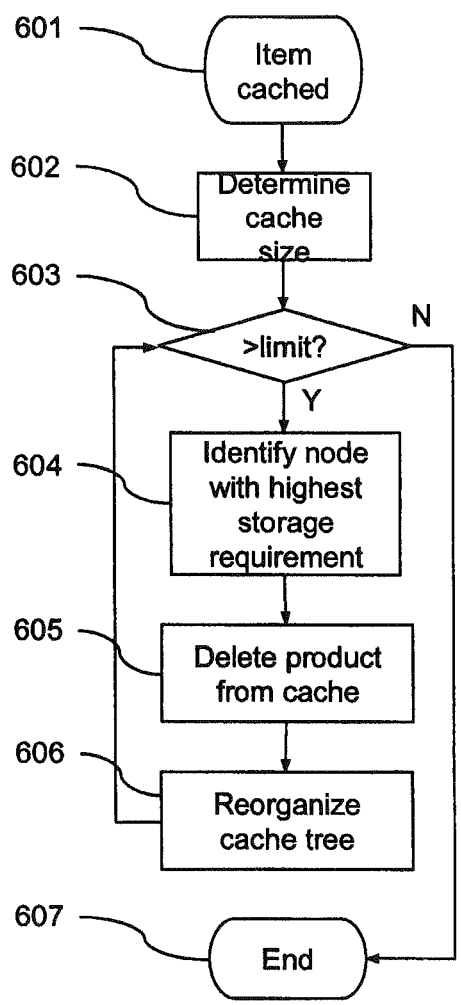
FIG. 6 is a flow diagram illustrating a cache manager module, in accordance with an embodiment.

The processing performed by the cache manager 105 when managing the size of the cache will now be described with reference to the flow chart of FIG. 6. Processing is initiated at step 601 in response to the addition of a cache candidate to the cache 107 and processing moves to step 602. At step 602 the current size of the cache 107 is determined and processing moves to step 603. At step 603 the current size of the cache 107 is compared to the storage threshold and if the storage threshold is exceeded processing moves to step 604. At step 604 the cache 107 is searched to identify the final or intermediate product 110, 109 occupying the greatest storage and processing moves to step 605. At step 605 the identified largest final or intermediate product 110, 109 is deleted from the cache 107 and processing moves to step 606. At step 606 the cache tree 301 is reorganised accordingly to take the removal of the largest final or intermediate product 110, 109 into account and processing returns to step 603 and proceeds as described above until at step 603 the size of the cache 107 meets or falls below the storage threshold. At this point, processing moves to step 607 and ends.

In one embodiment, each intermediate or final product is associated with metadata comprising at least one of its relevant set of control inputs. As will be understood by those skilled in the art, any suitable arrangement for recording the relevant set of one or more control inputs required to produce a given intermediate or final product may be provided suitable for a given implementation.

The sets of control inputs in embodiments described above are clearly associated by their label, such as A+B+C, with the names of the modules from which they are produced. As will be understood by those skilled in the art, in some embodiments, there may be no such association. In such embodiments, the application program or the cache manager is provided with suitable data for correlating modules, sets of control inputs and relevant intermediate or final products as required. As will be understood by those skilled in the art, the structure of the cache tree 301 is maintained in accordance with known tree maintenance principles. For example, appending or inserting a node at the appropriate point where in the absence of an immediate precursor/intermediate product or deletion of one or more nodes and the subsequent restructuring/reorganisation of the tree so as to fully represent the revised contents of the cache. As will be understood by those skilling the art, any suitable data structure, not limited to tree data structures, may be employed for representing the relationships between the intermediate and final products stored in the cache. In addition, it is understood that the cache contents and the associated cache tree or other suitable data structure may be stored in any suitable storage arrangement which may comprise one or more monolithic or distributed physical or virtual storage arrangements.

In another embodiment, RMV values may be stored in association with any member of the cache tree. Yet in another embodiment, the cache manager is arranged to take account of both storage size and RMV for each cached item when identifying a node to prune from the cache. In other words, the pruning threshold is a composite threshold that balances the storage requirement of an item against the resource required to produce the item. Thus in this embodiment, each cached item is associated with data representing the relevant RMV. Therefore, a large cache item with a large RMV would be kept in preference to a similarly large item with a smaller RMV. One method of achieving such a composite threshold would be to divide storage size by RMV to give a cost to benefit ratio (T). When pruning the cache, items with higher values of T would be pruned until the cache was within the required limits. As will be understood by those skilled in the art, if an item is simply too large for the cache it would be discarded regardless of its T value. As will be understood by those skilled in the art, any suitable resource usage or performance measure and associated threshold may be used for determining whether or not a given intermediate or final product should be cached or pruned from the cache. The resource measure may be performed by the application program as in embodiments described above or may be performed by a separate module or application program. The performance measure may use data generated by a third party program such as a processor activity monitor or other such CPU performance monitoring or measuring program.

In yet another embodiment, the application program is arranged to respond to requests for the production of a final products but not to respond to requests for an intermediate product. As will be understood by those skilled in the art, any suitable mechanism may be provided for providing the inheritance of RMV of precursors to subsequent intermediate or final products. In some embodiments, such RMV inheritance may be performed by the application program.

Those embodiments that enable caching of selected intermediate products so as to enable their re-use in producing subsequent products. This results in the performance of the software generation application program and associated computer being improved in speed or processing efficiency. In other words, a cached intermediate product reduces the processing resources or time required to produce an associated final product.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

What is claimed is:

1. A method for managing a cache, comprising:
    analyzing a first intermediate product of a computer program, wherein the intermediate product is produced by the computer program in response to a set of control inputs received by the computer program;
    identifying a resource measure associated with the production of the first intermediate product, the resource measure including a number of central processing unit (CPU) cycles used by the computer for processing the first intermediate product;
    determining a resource measure value by using the control inputs associated with the first intermediate product; and
    storing the first intermediate product as a discrete entry in the cache upon determination that the resource measure value exceeds a predetermined resource threshold.

2. A method according to claim 1, wherein the control inputs are stored in association with the first intermediate product in the cache.

3. A method according to claim 1, further comprising calculating a cumulative resource measure for the first intermediate product.

4. A method according to claim 3, further comprising storing the cumulative resource measure in the cache when the cumulative resource measure value exceeds a predetermined resource threshold.

5. A method according to claim 1, wherein in response to a request for a given product, searching the cache for any intermediate product associated with the computer program for that requested product.

6. A method according to claim 5, wherein when at least one intermediate product is identified, providing complete stored information related to that identified intermediate product for the requested product.

7. A method according to claim 5, wherein any intermediate product that exceeds a predetermined size limit is excluded from storage in the cache.

8. A method according to claim 1, wherein the cache has a tree data structure such that each node represents an intermediate product having a cumulative resource measure value exceeding a preselected threshold.

9. A method according to claim 1, wherein there is an arc between two nodes of the tree data structure such that an arc represents a second and a third intermediate product associated with sets of control inputs relating to the computer program for producing the third intermediate products from the second intermediate product.

10. A method according to claim 8, wherein the node representing any given intermediate product is added to the tree at a point of divergence from a common preceding intermediate product.

11. A method according to claim 8, wherein the tree is used in response to a request for providing a given intermediate product stored in the cache.

12. A method according to claim 1, wherein a plurality of final products are stored in the cache and associated with one or more intermediate products.

13. A cache management system comprising
    a computer configured to run at least one computer program;
    a cache in processing communication with the computer and configured to store a plurality of intermediate products produced by the computer program, wherein an intermediate product is produced by the computer program in response to a respective set of control inputs to the computer program;
    the computer configured for determining a resource measure associated with the production of a first intermediate product, the resource measure including a number of central processing unit (CPU) cycles used by the computer for processing the first intermediate product;
    the computer also configured for calculating a resource measure value for the first intermediate product in response to a first set of control inputs associated with the computer program; and
    the computer further configured for storing the first intermediate product as a discrete entry in the cache when the value of the resource measure exceeds a predetermined resource threshold.

14. The system according to claim 13, wherein the first set of control inputs is also stored when the first intermediate product is stored in the cache.

15. The system according to claim 13, wherein the computer is configured to search the cache for a given product associated with an intermediate product in response to a request for identifying any identified intermediate product.

16. The system according to claim 13, wherein the computer excludes storing in the cache any intermediate product that exceeds a predetermined size.

17. The system according to claim 13, wherein the cache is managed using a tree data structure and the tree is used for identifying one or more associated intermediate products.

18. The system according to claim 17, wherein the tree has nodes such that each node represents a given intermediate product at a point of divergence from a common preceding intermediate product.

19. A computer program product for managing stored data in a cache, the computer program product comprising:
    a non-transitory computer readable storage medium having computer readable program code embodied therewith, the computer readable program code comprising computer readable program code configured for:
    analyzing a first intermediate product of a computer program, wherein the intermediate product is produced by the computer program in response to a set of control inputs received by the computer program;
    identifying a resource measure associated with the production of the first intermediate product, the resource measure including a number of central processing unit (CPU) cycles used by the computer for processing the first intermediate product;

determining a resource measure value by using the control inputs associated with the first intermediate product; and storing the first intermediate product as a discrete entry in the cache upon determination that the resource measure value exceeds a predetermined resource threshold.

* * * * *